(12) United States Patent
Lin et al.

(10) Patent No.: US 6,508,110 B1
(45) Date of Patent: Jan. 21, 2003

(54) ATOMIC FORCE MICROSCOPE

(75) Inventors: Hsi-Hsiang Lin, HsinChu (TW); Shih-Che Lo, Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 35 days.

(21) Appl. No.: 09/716,283

(22) Filed: Nov. 21, 2000

(30) Foreign Application Priority Data

May 3, 2000 (TW) ...................................... 89207246 U

(51) Int. Cl.[7] ............................................... G01B 7/34
(52) U.S. Cl. ...................................................... 73/105
(58) Field of Search .............................. 73/105; 250/306

(56) References Cited

U.S. PATENT DOCUMENTS

| | | | | |
|---|---|---|---|---|
| 5,357,105 A | * | 10/1994 | Harp et al. ................. 250/306 |
| 5,412,980 A | | 5/1995 | Elings et al. ................. 73/105 |
| 5,567,872 A | | 10/1996 | Kyogaku et al. ............. 73/105 |
| 5,700,953 A | * | 12/1997 | Hlady et al. ................. 73/105 |
| 5,723,775 A | * | 3/1998 | Watanabe et al. ........... 73/105 |
| 5,939,715 A | * | 8/1999 | Kitamura et al. ........... 250/306 |
| 5,955,660 A | * | 9/1999 | Honma ....................... 73/105 |
| 5,983,713 A | * | 11/1999 | Matsuzaki ................... 73/105 |
| 6,079,254 A | * | 6/2000 | Chen et al. .................. 73/105 |
| 6,169,281 B1 | * | 1/2001 | Chen et al. .................. 73/105 |
| 6,281,495 B1 | * | 8/2001 | Kitamura .................... 73/105 |

* cited by examiner

*Primary Examiner*—Daniel S. Larkin
(74) *Attorney, Agent, or Firm*—Shoemaker and Mattare

(57) ABSTRACT

A tapping mode atomic force microscope includes a sinusoidal signal generator. The sinusoidal signal generator generates sinusoidal wave signals to a modulating laser diode for outputting a pulsed laser beam. The laser beam reflects from the back side of a photo detector and then a current signal with a corresponding intensity is output b y the photo detector. Then, the signal is converted by a current to voltage converter and then is operated by a differential amplifier. After the DC component and the undesired multiple frequency harmonics of the current signal is filtered by a band pass filter, the current signal is processed by a demodulation circuit and a low pass filter to produce a voltage value corresponding to probe deformation. After inputting this voltage value to a Z-axis servo controller, a corresponding control command is acquired based on a control algorithm so as to keep the value of the probe deformation constant. If the position of the Z-axis is recorded at a specific time point and all the data are collected, the surface profile of the test sample can be obtained.

14 Claims, 10 Drawing Sheets

(a)

(b)

(c)         (d)

(a)

(b)

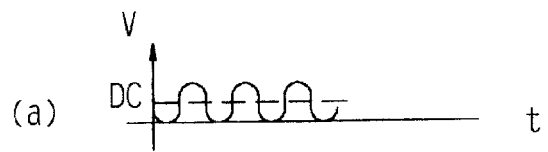
(a)
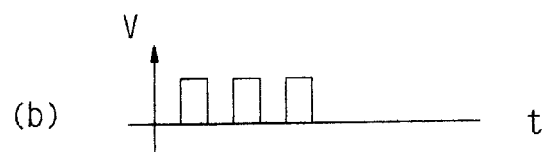
(b)
FIG. 8
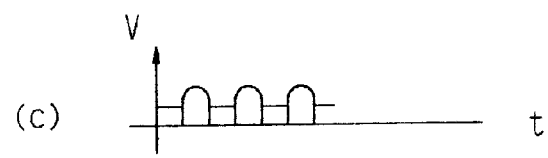
(c)
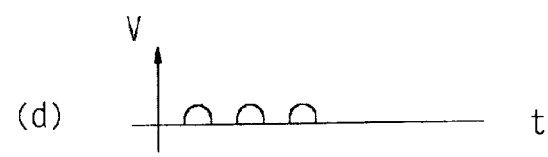
(d)
(e)

(a)

(b)

ATOMIC FORCE MICROSCOPE

BACKGROUND OF THE INVENTION

1. Field of the Invention

The present invention relates to microscopes, and more particularly to an atomic force microscope that uses a probe tip to detect the surface of a test sample by the displacement of a laser beam.

2. Description of Prior Art

The relationship of distance and relative force between the probe tip of an atomic force microscope or a scanning atomic force microscope (AFM) and the surface of a test sample to be scanned by the probe is depicted in FIG. 1. As shown, the abscissa represents the distance between the probe tip and the surface of the test sample, while the positive ordinate represents the repulsive force between the probe tip and the surface of the test sample and the negative ordinate represents the attractive force between the probe tip and the surface of the test sample. Consequently, there are two types of atomic force microscopes: one applied to an operation zone assigned with reference numeral A' shown in FIG. 1 which is subject to the contact mode under repulsive force and the other one applied to an operation zone assigned with reference numeral B' shown in FIG. 1 which is subject to the tapping mode under repulsive force and attraction force.

The contact mode AFM uses a repulsive force between a probe tip and the surface of the scanned test sample. If the distance between the probe tip and the surface of the scanned test sample obtaining from scanning a probe is larger than 0 and less than d1, the scanning probe will be separated from the atom on the surface of the scanned test sample due to the repulsive force. For a tapping mode atomic force microscope, a repulsive force occurs when the distance between the probe tip and the surface of the scanned test sample is between 0 and d1. When the distance between the probe tip and the surface of the scanned test sample is larger than d1 and less than d2, the probe tip and the surface of the scanned test sample will attract each other to keep them in oscillation in a distance between 0 and d2 (like tapping).

The structure of a contact mode atomic force microscope is illustrated in FIG. 2. The probe tip 1a of the scanning probe 1 scans the surface of the test sample (not shown in the figure). The discontinuous signal generator 3 produces a discontinuous signal that will be sent to the modulating laser diode 4 to output a discontinuous laser beam. The laser beam reflects from the back side of the probe 1 to a photo detector 5 and it will then output a current signal corresponding to the intensity of the laser beam by a photoelectron conversion effect. The output current signal will be then converted into a voltage signal by a current/voltage converter 6 and calculated by a differential amplifier 7 to obtain a voltage value corresponding to the deformation of the probe 1. After entering this voltage value to a Z-axis servo controller on the piezoelectricity platform (only the seat is shown), a corresponding control command will be obtained on the basis of the control calculation principle (for example, proportional integral differential, PID) to make the piezoelectricity platform seat 2 move up and down and keep the deformation value of the probe 1 be constant. If the position of Z-axis is recorded at a specific time point and all the data are collected, the surface profile of the test sample can be obtained. Because the laser beam is a kind of pulse signal, the voltage value of the deformation of probe 1 or the position of Z-axis may be discontinuous. To obtain a smoother servo controlled and scanning image, an interpolation operation 8 is employed to compensate the signals or data where no laser beam is used. The resulting data are stored in a scanning image data storage device 9 and incorporated into a collected data point to display on a display 19 after processing by an image-processing device 18. Because the structure of a contact mode atomic force microscope uses a discontinuous laser beam, it can effectively reduce the heat deformation problem resulting from the laser beam. But it must use interpolation operation and cannot filter the interference caused, for example, by the coaxial light radiated from the charge coupling device (CCD) at the scanning probe or from a miscellaneous light source. All these are disadvantages thereof.

Details of the above-mentioned contact mode atomic force microscope may refer to the application for U.S. Pat. No. 5,567,872 with a title of "Scanning Atomic Force Microscope" submitted by Kyogaku et al., filed on Mar. 7, 1995.

The structure of a known tapping mode atomic force microscope is shown in FIG. 3. The probe tip 1a of the scanning probe 1 scans the surface of the test sample (not shown in the figure). A sinusoidal wave signal generator 10 produces a sinusoidal wave signal that will be sent to a piezoelectricity oscillator 12 to make it vibrate in a manner similar to the sinusoidal wave. This further causes the probe 1 also to move in manner similar to the sinusoidal wave through the transmission of the mechanism. The laser diode 4 outputs a laser beam. The laser beam reflects from the back side of the probe to a photo detector 5 and it will then output a current signal corresponding to the intensity of the laser beam by photoelectric conversion effect. The output current signal will be then converted into a voltage signal by a current/voltage converter 6 and calculated by a differential amplifier 7 to obtain a voltage value corresponding to the amplitude of the probe 1 after the calculation of a digitized signal processor or an analog mean square root signal processing circuit 11. After entering the voltage value to the Z-axis servo controller on the piezoelectricity platform (only the seat is shown), a corresponding control command will be obtained on the basis of the control calculation principle (for example, proportional integral differential, PID) to make the piezoelectricity platform seat 2 move up and down and keep the amplitude of the probe 1 be constant. If the position of Z-axis is recorded at a specific time point and all the data are collected and stored in a scanning image data storing device 9, the surface profile of the test sample can be obtained and displayed on a displayer 19 after being processed by an image data processing device 18. Because the probe tip 1a of the scanning probe contacts only for a considerable short time with the surface of the test sample (not shown in the figure), there is no friction during the scan, which further reduces the surface tension caused by the water molecule on the test sample and the influence of static electricity. Besides, the interference resulting from the vibration of the mechanism itself can be effectively isolated. However, the above-mentioned tapping mode atomic force microscope must have a digitized signal processor or analog mean square root signal processing circuit 11 to obtain the amplitude of AC signals, and the heat deformation caused by continuous laser beams will twist the scanned image. All these are disadvantageous.

Details of the above-mentioned tapping mode atomic force microscope may refer to U.S. Pat. No. 5,412,980 with a title of "Tapping Atomic Force Microscope" submitted by Elings et al., filed on Aug. 7, 1992.

SUMMARY OF THE INVENTION

In the present invention, under the consideration of the fact that the above-mentioned contact mode atomic force microscope must use an interpolation calculation and, therefore, cannot filter the interference caused, for example, by the coaxial light radiated from the current coupling device (CCD) at the scanning probe or the miscellaneous light source, and another, tapping mode atomic force microscope must use a digital signal processor or analog mean square root signal processing circuit to obtain the amplitude of AC signals, and the scanned image will be twisted due to the heat deformation caused by continuous laser beams. It can improve the disadvantages of the above-mentioned contact and tapping modes.

Accordingly, the objective of the present invention is to provide a contact mode atomic force microscope which can reduce the degree of heat deformation caused by laser beams, without the need of interpolation calculation, and can filter the interference caused by the coaxial light radiated from the current coupling device (CCD) or the miscellaneous light source.

Another objective of the present invention is to provide a tapping mode atomic force microscope which can acquire an amplitude of an AC signal by the characteristics of the tapping mode and combining with a low pass filter circuit and can reduce the degree of heat deformation caused by laser beams.

The contact mode atomic force microscope of the present invention uses the pulse signal produced by a pulse signal generator to control, for example, the laser mechanism of modulating laser diodes and output a laser beam in pulse form. The laser beam will reflect from the back side of the probe tip to, for example, a pickup of a laser photo detector in four quadrants and it will then output a current signal corresponding to the intensity of the laser beam. After a conversion from the current signal to the voltage signal is performed, the signal will be calculated by, for example, a magnifying circuit of the differential amplifying circuit. The DC part caused by the coaxial light radiated from the current coupling device (CCD) or the miscellaneous light source and the high frequency harmonic signals caused by the pulse modulation laser beam will be filtered out by a band pass filter. After the modulation/demodulation process made with a mixer/multiplier and the filtration with a low pass filter, a distribution signal having the same frequency as that of the laser before modulating is obtained and, as a consequence, a voltage value corresponding the deformation of the probe can be obtained and uses the value to measure the surface profile of the whole test sample. The present invention uses pulsed laser beams to reduce the heat deformation caused by the laser. The present invention also uses modulation/demodulation process to filter the interference caused by the coaxial light of CCD and other miscellaneous light source. Since the output signal of the present invention is continual, the interpolation operation in unnecessary.

The tapping mode atomic force microscope of the present invention uses the sinusoidal wave signal produced by a sinusoidal wave signal generator and sends it to a piezoelectricity oscillator to bring the probe to move in manner similar to a sinusoidal wave. A phase locked loop produces a pulse modulation signal synchronous with the vibration of the probe to make the laser mechanism (such as laser diode) output a pulse laser beam. The laser beam will reflect from the back side of the probe tip to, for example, a pickup of a photo detector in four quadrants. The current signal corresponding to the intensity of the laser beam will be converted into a voltage signal that will be calculated by, for example, a differential amplifying circuit. The DC part and the high frequency harmonic signal will be filtered out by a band pass filter. After the demodulation process and the filtration of a low pass filter, a voltage value corresponding to the amplitude of the probe can be obtained to keep the amplitude of the probe in a certain value and further measure the surface profile of the whole test sample. Instead of the digital signal processor or analog mean square root signal processor, the present invention uses low pass filter to obtain the amplitude of AC signals. The present invention uses a phase locked loop to produce pulse modulation signals synchronous with the vibration of the probe to make a laser diode output a pulsed laser beam to reduce the heat deformation caused by the laser.

If there is no interference caused by the coaxial light of CCD or miscellaneous light source, this inverted AFM will not use any bandpass filter and demodulation circuit. The voltage value corresponding to the amplitude of the probe can be obtained merely through the filtration of the calculation output of the differential amplifying circuit with a low pass filter.

BRIEF DESCRIPTION OF THE DRAWINGS

The following explanations of the figures will illuminate the goals and advantages of the present invention. The same reference numbers in the figure represent the corresponding parts of the relative numbers, where:

FIG. 8 shows the processing condition of each signal in the application in FIG. 7;

DETAILED DESCRIPTION OF PREFERRED EMBODIMENT

Figure 1:
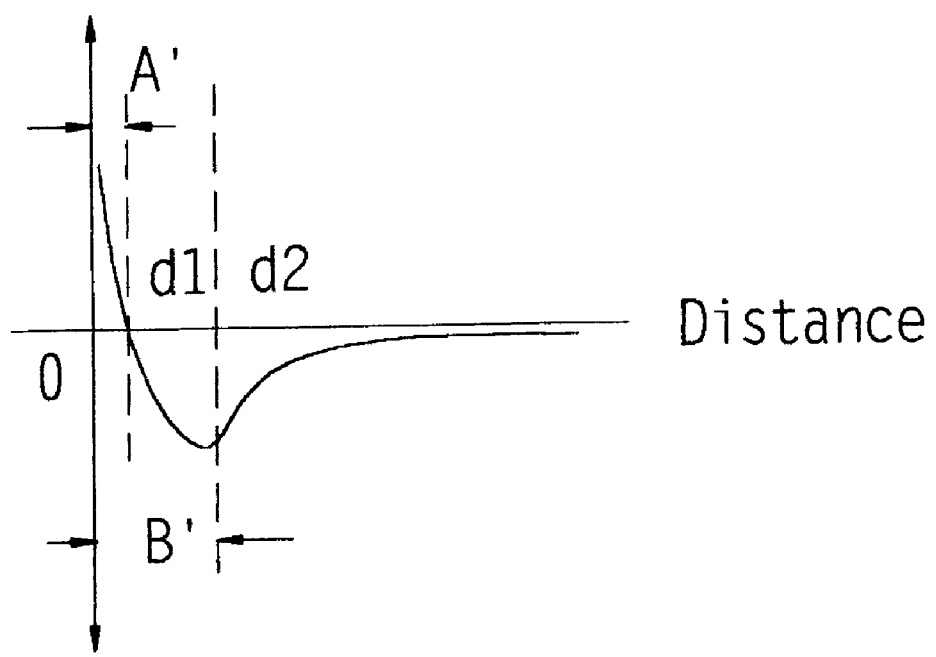
FIG. 1 (Prior Art) shows the curve of the distance and the working force relationship between the probe tip used in the atomic force microscope and the surface of the scanned test sample.
Figure 2:
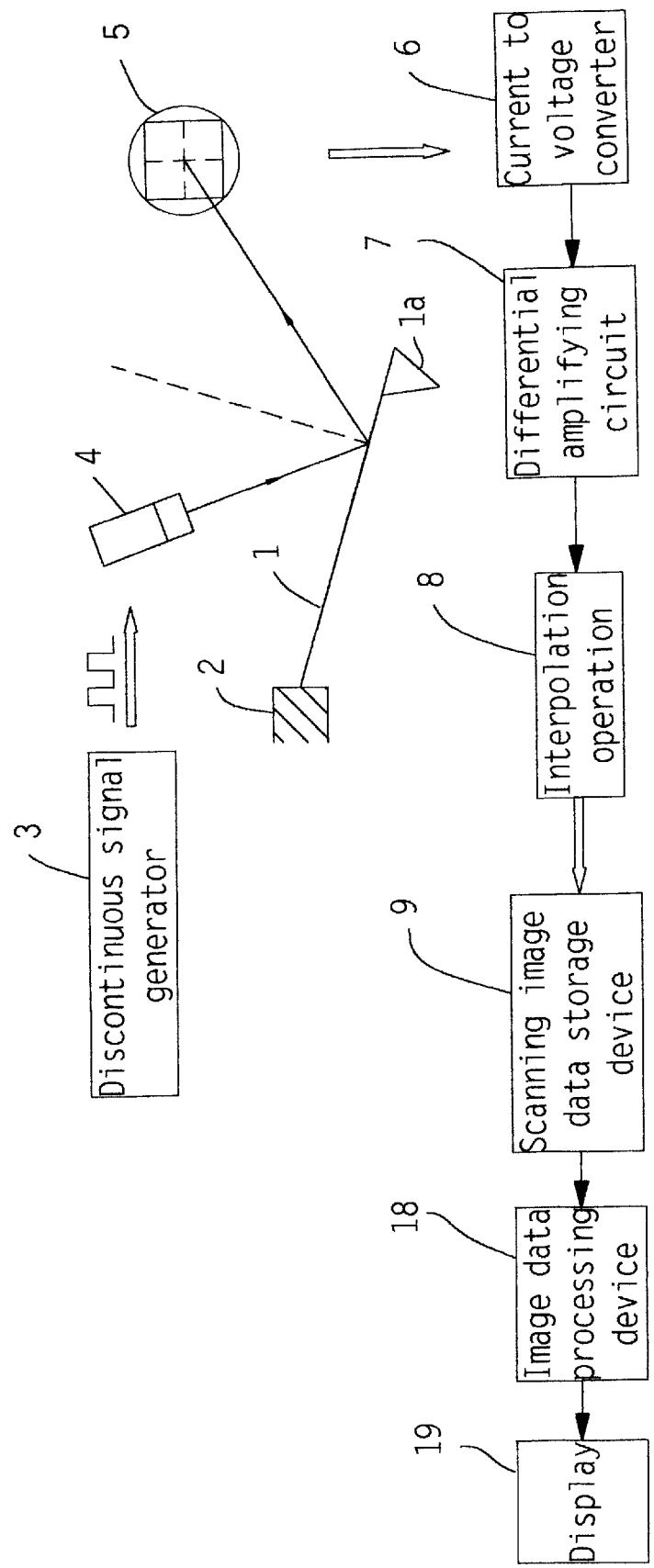
FIG. 2 (Prior Art) shows the construction of the above-mentioned contact mode atomic force microscope.
Figure 3:
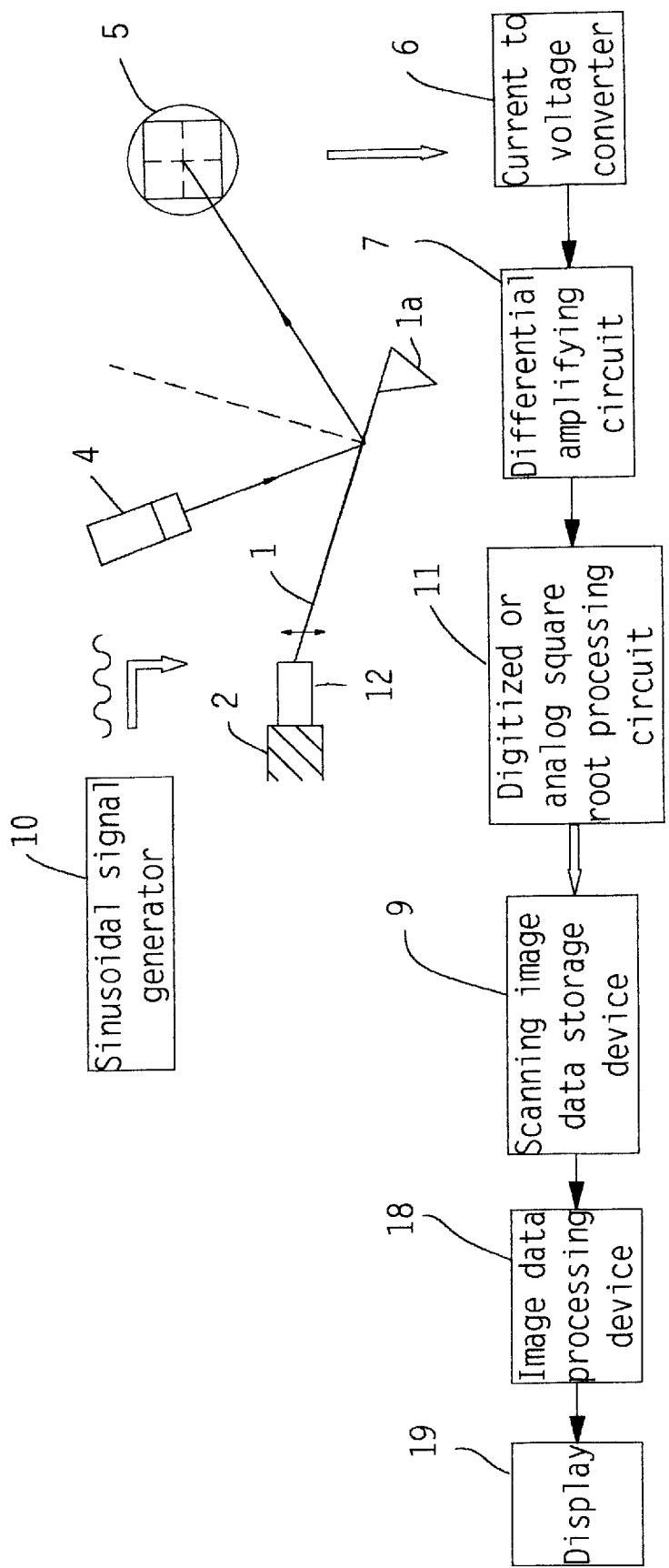
FIG. 3 (Prior Art) shows the construction of the above-mentioned tapping mode atomic force microscope.
Figure 4:
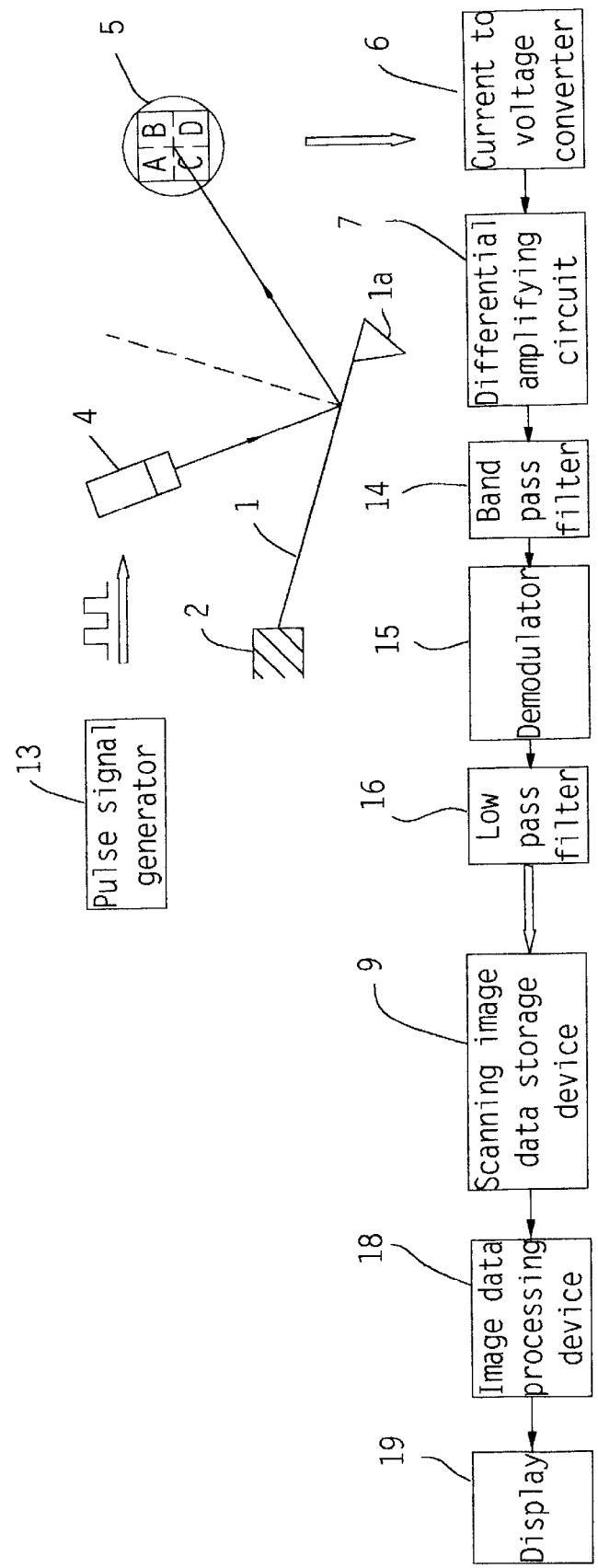
FIG. 4 shows the application and construction of the newly invented contact mode atomic force microscope.

The first embodiment of the present invention is a contact mode atomic force microscope, as illustrated in FIG. 4. One end of the probe 1 is fixed on the seat 2, the tip of the probe 1a is driven by a moving mechanism (not shown) to scan along the surface of the scanned test sample (not shown). A pulse signal generator 13 generates a pulse signal which is then output to a modulating laser diode 4 to send a pulse laser beam. This pulse laser beam reflects from the back side of probe 1 to a position sensor or photo detector 5 of the detector in the four quadrants of a position sensor. A current signal corresponding to the intensity of the laser beam will be output by the photo detector 5 and converted into a voltage signal by the current/voltage converter 6. The voltage value will be calculated by an operation amplifying circuit (The photo detector 5 uses a four-quadrant photo detector in this example, so the operation amplifying circuit is the differential amplifying circuit 7) and the DC part and undesired frequency doubling signal if filtered by the band pass filter 14. The voltage value corresponding to the deformation of the probe 1 can be obtained after the process of the demodulation circuit 15 and low pass filter 16. After entering this voltage value to the Z-axis servo controller on the piezoelectricity platform (not shown), a corresponding control command will be obtained basis on the control algorithm (for example, proportional integral differential, PID) to make the piezoelectricity platform seat 2 move up and down and keep the deformation value of the probe 1 constant. If the position of Z-axis is recorded at a specific time point and all data are collected and stored in the scanning image data storing device 9; the surface profile of the test sample may be displayed on the displayer 19 after processing by the image process device 18.

Figure 5:
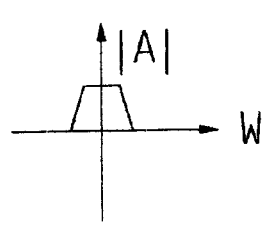
FIG. 5 shows the processing condition of the frequency spectrum of CCD coaxial light and that of the reflected pulse laser beams used in the application in FIG. 4.
Figure 5:
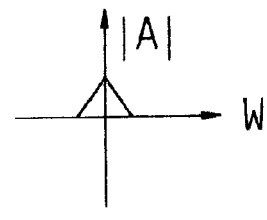
Figure 5:
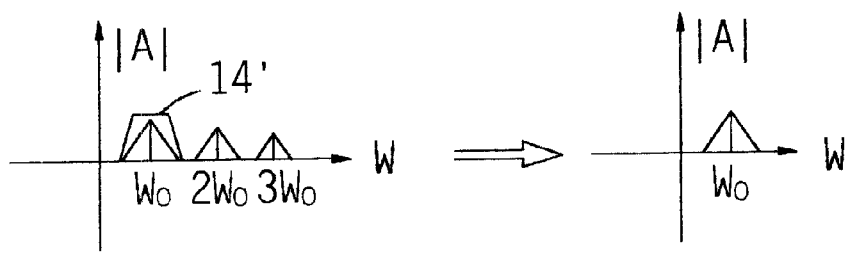
Figure 6:
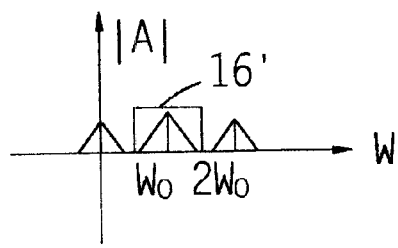
FIG. 6 shows the continuous demodulation and low pass filter processing in the frequency spectrum in FIG. 5.
Figure 6:
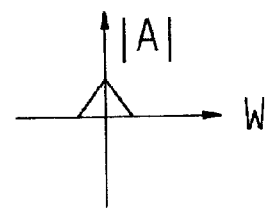

The applied principles of the above-mentioned example are further described as follows:

In FIG. 4, the current signals of the relative output intensities of the laser beams in the four quadrants A, B, C, D reflecting into the photo detector 5 of the four-quadrant photo detector are $i_A$, $i_B$, $i_C$, $i_D$, respectively. Because the pulsed laser beam has a pulsed shape, the current signal output from the photo detector 5 of the four-quadrant photo detector is also in a pulsed shape. The electric current signals can be individually converted to voltage signals VA=RxiA, VB=RxiB, VC=RxiC, VD=RxiD by current to voltage converter 6, where "R" means electric resistance. The four quadrant photo detector can be differentially amplified with the operation of the differential amplifying circuit 7, and the up/down differential voltage VT−B=(VA+VB)(VC+VD) and the left/right differential voltage VL−R=(VA+VC)−(VB+VD) can be derived. Because the reflected laser light received by the photo detector 5 could be interfered by the coaxial light of a CCD or a miscellaneous light source, the frequency spectrum of the coaxial light of the CCD and the reflected pulse laser beam are shown in FIG. 5. In this figure, part (a) shows the frequency spectrum of coaxial light of the CCD on the location of scanning probe. Part (b) in FIG. 5 shows the frequency spectrum of the continuous laser beam. When the pulsed laser beam is produced by the continuous laser beam illustrated in FIG. 5(*b*) through a turning on/off action, multiple frequency harmonic waves are produced as shown in FIG. 5(*c*). Direct currents produced by the CCD and the undesired laser multiply frequency harmonic signal can be filtered out by band pass filter 14 as shown in 14' of FIG. 5(*c*), and the obtained frequency spectrum is shown in FIG. 5(*d*). Then, using a demodulation circuit 15 (such as a mixer or multiplier) to demodulate the frequency spectrum shown in FIG. 5(*d*), a frequency spectrum can be obtained as shown in FIG. 6(*a*). Then, a low pass filter 16 serves to filter out the frequency multiply elements as illustrated in 16' of FIG. 6(*a*). A signal with the same frequency distribution as that of the laser before demodulation can be obtained as shown in FIG. 6(*b*) so that the purpose of filtering out the interference resulting from coaxial light of the CCD or the miscellaneous light source could be achieved.

Because this example uses the current signals of the relative output intensities of the laser beams in the four quadrants reflecting to the photo detector of the four quadrant position detector, a voltage value corresponding to the deformation of the probe 1 can be obtained. After inputting this voltage value to the Z-axis servo controller on the piezoelectricity platform, a corresponding control command will be obtained based on the control calculation principle to keep the deformation value of the probe 1 constant. If the position of Z-axis is recorded at a specific time point and all the data are collected, the surface profile of the test sample can be measured.

The laser beam in the contact mode atomic force microscope is a pulse signal that can reduce the heat deformation caused by the laser. Besides, due to the benefit of modulation and demodulation, the interference caused by the coaxial light of the CCD or the miscellaneous light source can be filtered and the interpolation calculation can be omitted because the output signal is a continuous signal.

Figure 7:
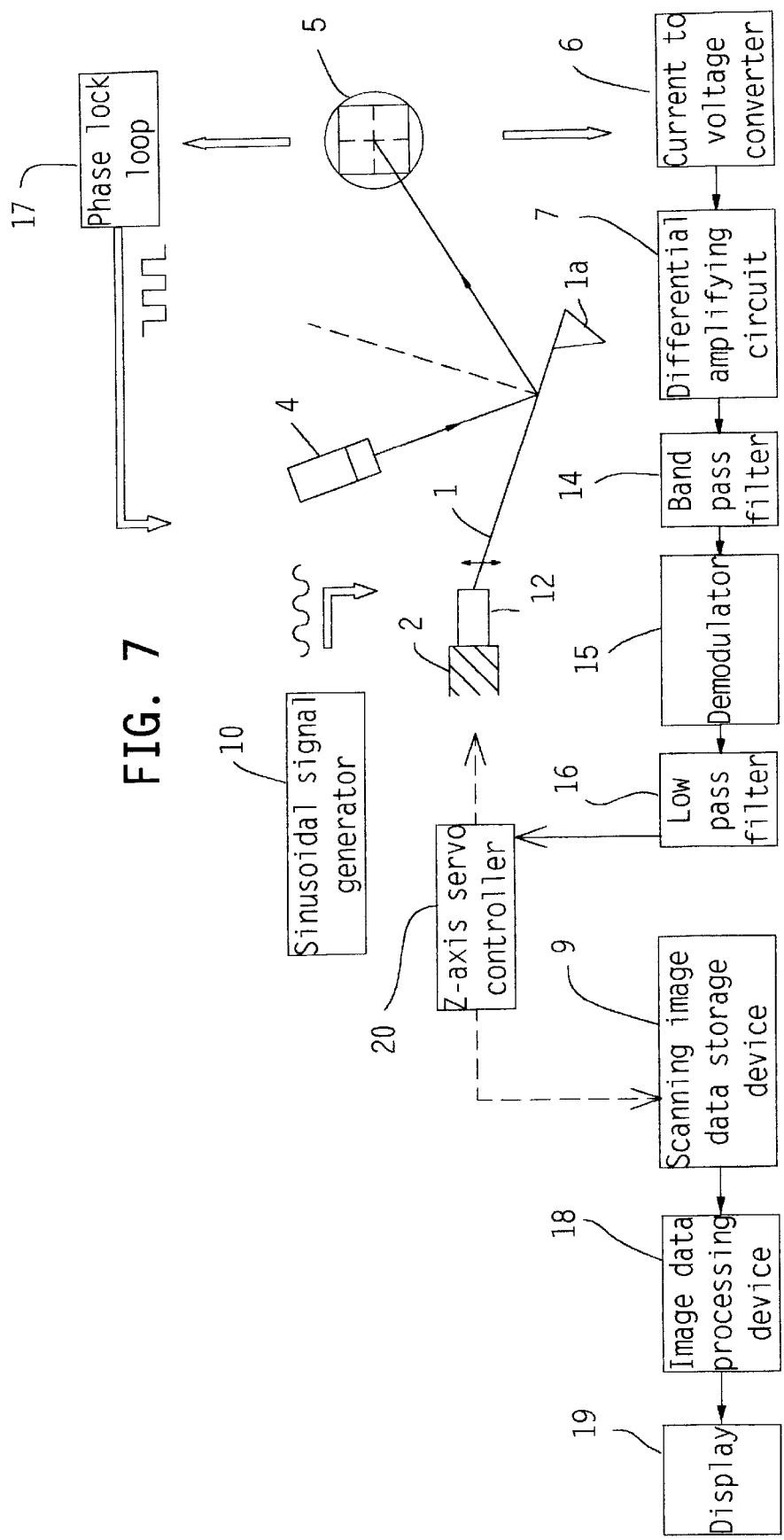
FIG. 7 shows the application and construction of the newly invented tapping mode atomic force microscope.

The second example of the present invention is a tapping mode atomic force microscope as shown in FIG. 7. One end of the probe 1 is fixed on the oscillator 12 of the seat 2, the sharp probe 1*a* is driven by a movement mechanism (not displayed in the figure) to scan on the surface of the scanned test sample (not shown in the figure). The sinusoidal wave signal generator 10 produces a sinusoidal wave signal that will be sent to a piezoelectricity oscillator 12 to make it vibrate in a manner similar to the sinusoidal wave. This further causes the probe 1 to also move in manner similar to the sinusoidal wave through the transmission of the mechanism. The phase-lock loop 17 produces a pulse modulation signal synchronous with the vibration of the probe to make the laser mechanism (such as laser diode) output a pulsed laser beam. This laser beam reflects from the back side of probe 1 to a position sensor or photo detector 5 of the detector in the four quadrants. A current signal corresponding to the intensity of the laser beam will be output by the photo detector 5 and converted to a voltage signal by the current to voltage converter 6. The voltage value will be calculated by an operation amplifying circuit (the photo detector 5 uses a four-quadrant photo detector in this example, so the OP amplifying circuit is the differential amplifying circuit 7) and the DC part and undesired frequency harmonic signal is filtered out by the band pass filter 14. The voltage value corresponding to the deformation of the probe 1 can be obtained after the process of the demodulation circuit 15 and low pass filter 16. After inputting this voltage value into the Z-axis servo controller 20 on the piezoelectricity platform, a corresponding control command will be obtained on the basis of the control calculation principle (for example, proportional integral differential, PID) to make the piezoelectricity platform seat 2 move up and down and keep constant the deformation value of the probe 1. If the position of Z-axis is recorded at a specific time point and all the data are collected and stored in the scanning image data storing device 9, the surface profile of the test sample may display on the displayer 19 after being processed by the image data process device 18.

The principle and procedure of the above-mentioned tapping mode atomic force microscope are further described as follows:

The modulation sinusoidal wave signal generated by the sinusoidal wave signal generator 10 is displayed in FIG. 8(*a*). A phase-lock loop 17 locks the frequency and phase of the sinusoidal wave signal generated by the sinusoidal wave generator to produce a pulse modulation signal with the same frequency as that of the probe 1 as shown in FIG. 8(*b*). When a positive pulse is inputted, the laser diode 4 emits the laser beams (ON); the laser beams won't be released without the positive pulse (OFF). The released pulsed laser beam will reflect from the back side of the probe 1 to the photo detector 5, through the photoelectric conversion effect, the electric current signal corresponding to the laser beam intensity is output. The current to voltage converter 6 converts the electric current signal to voltage signal as shown in FIG. 8(c). It is known that as using this apparatus, the laser point should aim at the center of the photo detector 5 for reducing the DC component generated as most as possible as the photo detector 5 receives signals. The voltage signal is output from the current to voltage converter 6, through the operation of differential amplifying circuit 7, and by a band pass filter 14 to filter out the direct current resulting from a CCD and the undesired laser multiple frequency harmonic signal (the further description see below), a waveform as shown in FIG. 8(d) is obtained. By the filtering of the low pass filter 16, a voltage value relative to the vibration amplitude of the probe 1 can be obtained as shown in FIG. 8(e). Inputting this voltage value to the Z-axis servo controller, a corresponding control command is obtained for keeping the amplitude of the probe 1 constant. Recording and integrating the location of Z-axis on the surface of the scanned test sample surface can obtain the surface profile of the test sample.

Figure 9:
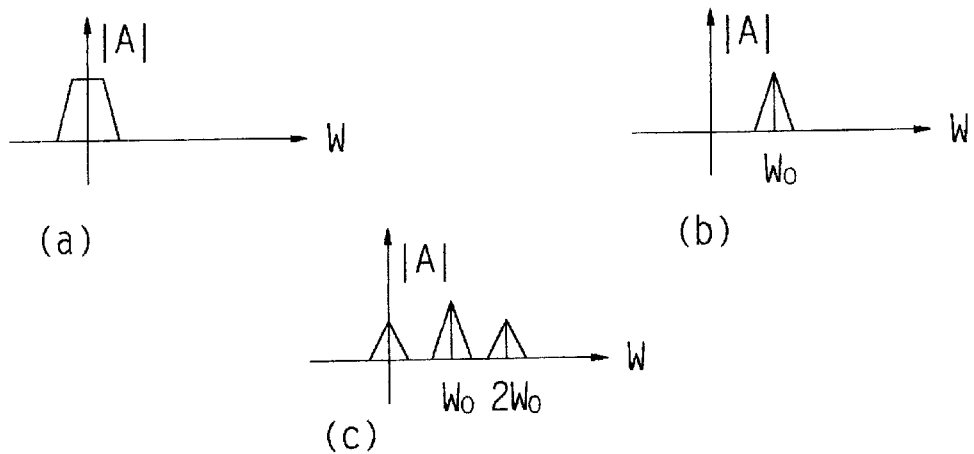
FIG. 9 shows the frequency spectrum of CCD coaxial light and that of the reflected pulse laser beams used in the application in FIG. 7.

The frequency spectrum of coaxial light of a CCD on the location of the scanning probe is shown in FIG. 9(a). The frequency spectrum of pulsed laser beams output by the photo detector 5 before the laser beams are modulated is shown in FIG. 9(b). But after the laser beams are modulated by the pulse signal, the harmonic wave signal is generated as shown in FIG. 9(c).

Figure 10:
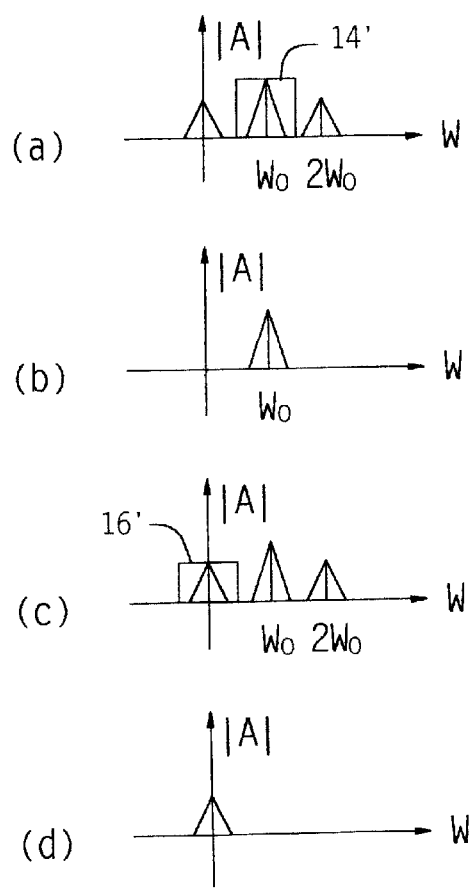
FIG. 10 shows the processing condition of the frequency spectrum in FIG. 9.

In the above-mentioned example of tapping mode, the electric current signal output from current to voltage converter 6 is calculated by differential amplifying circuit 7 and by the band pass filter 14 to filter out the;direct current resulting from a CCD and the undesired laser frequency multiply signal as shown in FIG. 10.

After the differential amplifying circuit 7 outputting the harmonic wave signal shown in FIG. 9(c), the band pass filter 14 can be used to filter out the direct current resulting from a CCD and the undesired laser frequency spectrum as shown in FIG. 10(a) 14', in order to obtain the frequency spectrum as shown in FIG. 10(b). Then using the mixer to demodulate the frequency spectrum as shown in FIG. 10(b), the frequency spectrum as shown in FIG. 10(c) is obtained. Next, the low pass filter 16 is used to filter as the 16' illustrated in FIG. 10(c) for filtering out the harmonics therein so as to acquire signals having a distribution as the unmodulated laser light, as illustrated in FIG. 10(d). Therefore, the purpose of, for example, filtering the interference caused by the coaxial light of a CCD or a miscellaneous light source is achieved.

Figure 11:
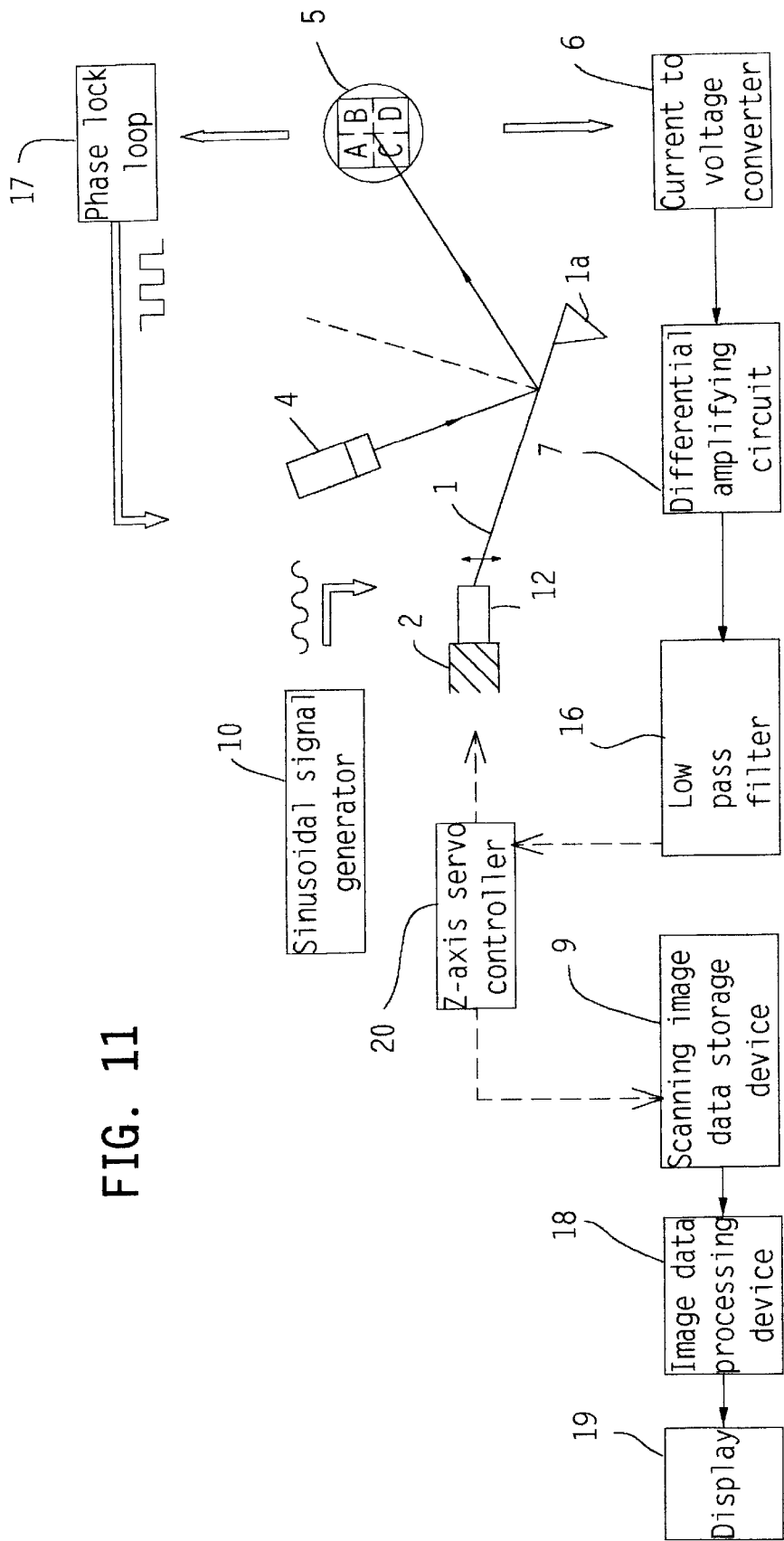
FIG. 11 shows another application and construction of the newly invented tapping mode atomic force microscope.

If there in no such interference caused by the coaxial light of a CCD or a miscellaneous light source, the band pass filter 14 and the demodulation circuit 15 can be omitted. As shown FIG. 11, the phase-lock loop 17 produces a pulse modulation signal synchronous with the vibration of the probe to make the laser diode output a pulsed laser beam. This laser beam reflects from back side of tip of the probe 1 to the pickup 5 of the detector in the four quadrants. A current signal corresponding to the intensity of the laser beam will be output by the pickup 5 and converted to a voltage signal by the current to voltage converter 6. The voltage value will be calculated by the differential amplifying circuit 7. The voltage value corresponding to the deformation of the probe 1 can be obtained after being processed by the low pass filter 16. After entering this voltage value to the Z-axis servo controller 20 on the piezoelectricity platform, a corresponding control command will be obtained on the basis of the control operation principle (for example, proportion integral differential, PID) to keep the deformation value of the probe 1 constant and further measure the surface profile of the test sample.

Figure 12:
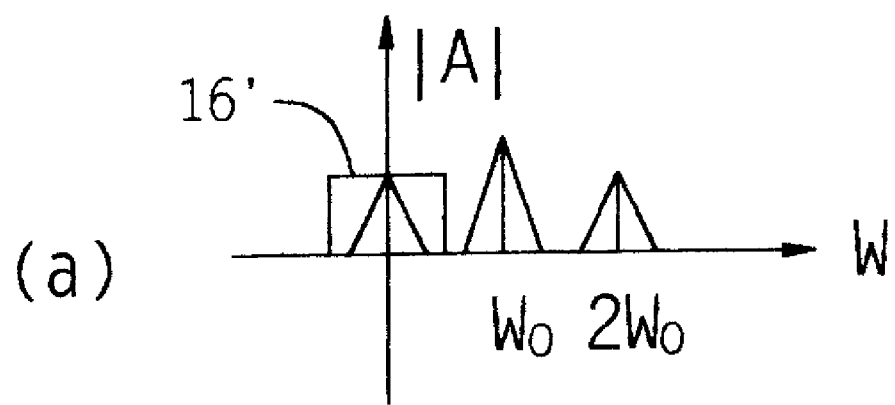
FIG. 12 shows the frequency spectrum and the processing condition of the reflected pulse laser beams used in the application in FIG. 11.
Figure 12:
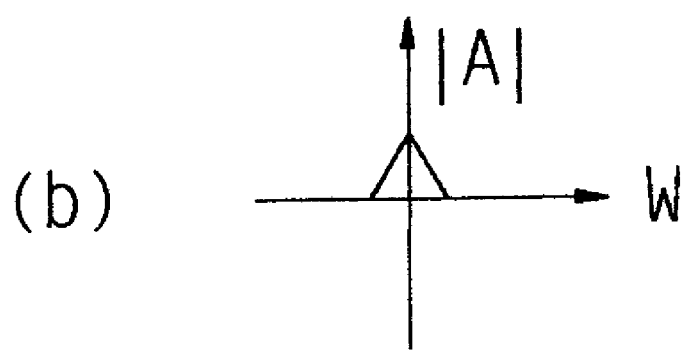

In this example, when the differential amplifying circuit 7 outputs the harmonic wave signal shown in FIG. 9(c), the filtration shown in FIG. 12(a) 16' can be performed with the low pass filter 16 to remove frequency harmonic components. The distribution signal is the same as that of the laser beam before modulation, as shown in FIG. 12(b).

The tapping mode atomic force microscope uses mechanism modulation for the demodulation of the light modulation signal. The amplitude of the AC signal can be obtained effectively by using the characteristics of the tapping mode together with the low pass filter, and without needing to use digital signal processor or analog mean square root signal processing circuit. The pulsed laser beam can reduce the heat deformation caused by the laser to prevent the scanned image from twisting.

Although the present invention is described through the above-mentioned examples, it should be noted that all changes or modifications within the wide spirit and viewpoint defined in the attached application of patent belong to the range of the present invention.

What is claimed is:

1. An atomic force microscope comprising:
    a probe having an end fixed to a piezoelectric oscillator on a seat and having a probe tip at another end arranged proximately to a surface of a slice to be scanned, said probe being driven to scan over a surface of the slice;
    a sinusoidal wave generator for producing sinusoidal wave signals and sending said sinusoidal wave signals to said piezoelectric oscillator so that said piezoelectric oscillator generates an oscillation similar to a sinusoidal wave, and further said probe also generates a vibration like a sinusoidal wave;
    a phase-lock loop for locking frequency and phase of said sinusoidal wave signal generated by said sinusoidal wave generator to produce a pulse modulation signal with the same frequency as that of said probe;
    a laser unit for receiving said pulse modulation signal generated by said phase-lock loop and outputting pulsed laser beams; the pulsed laser beams being emitted to a back side of the probe and then being reflected therefrom;
    a photo detector for receiving reflected laser beams from said back side of said probe and outputting a current signal corresponding to the intensity of said laser beam;
    a current to voltage converter for converting said current signal sent by said photo detector into a voltage signal;
    an operation amplifying circuit for calculating and amplifying each voltage signal output from said current to voltage converter;
    a low pass filter for low-pass filtering said output signal from the operation amplifying circuit for acquiring a voltage value corresponding to an amplitude of the vibration of said probe;
    a Z-axis servo controller for receiving a voltage value corresponding to an amplitude of a vibration of said probe output from the low pass filter and then generating a corresponding control command through an operation base on a control algorithm for controlling upward and downward movements of said seat so as to keep an amplitude of the vibration of said probe in a predetermined value;

a scanned image data storage device for storing image data of each data point collected by scanning the surface of said slice with said probe;

an image data processor for processing said stored image data; and a display for displaying processed image data.

2. The atomic force microscope as claimed in claim 1, wherein said photo detector is a position detector.

3. The atomic force microscope as claimed in claim 1, wherein said photo detector is a four-quadrant photo detector and said operation amplifying circuit is a differential amplifying circuit.

4. The atomic force microscope as claimed in claim 3, wherein said differential amplifying circuit serves for calculating and amplifying upper/lower differential voltages and left/right differential voltages of said four-quadrant photo detector.

5. The atomic force microscope as claimed in claim 1, wherein said Z-axis servo controller employs a control algorithm of proportional integral differential (PID).

6. The atomic force microscope as claimed in claim 1, wherein said display shows a surface profile of said slice.

7. The atomic force microscope as claimed in claim 1, further comprising:

a band pass filter for band-pass filtering signals output from said operation amplifying circuit;

a demodulation circuit for demodulating said signal filtered by the band pass filter wherein the low pass filter filters said demodulated signal for acquiring a voltage value corresponding to an amplitude of the vibration of said probe.

8. The atomic force microscope as claimed in claim 7, wherein said photo detector is a position detector.

9. The atomic force microscope as claimed in claim 7, wherein said photo detector is a four-quadrant photo detector and said operation amplifying circuit is a differential amplifying circuit.

10. The atomic force microscope as claimed in claim 9, wherein said differential amplifying circuit serves for calculating and amplifying upper/lower differential voltages and left/right differential voltages of said four-quadrant photo detector.

11. The atomic force microscope as claimed in claim 7, wherein said band pass filter filters out the DC component and multiple frequency harmonics signals.

12. The atomic force microscope as claimed in claim 7, wherein said Z-axis servo controller employs a control algorithm of proportional integral differential (PID).

13. The atomic force microscope as claimed in claim 7, wherein said demodulation circuit is a mixer or a multiplier.

14. The atomic force microscope as claimed in claim 7, wherein said display shows a surface profile of said slice.

\* \* \* \* \*